Sept. 10, 1968    E. S. WARNER    3,400,582
BOAT SPEED INDICATOR
Filed May 8, 1967    2 Sheets-Sheet 1

INVENTOR.
ERIC S. WARNER
BY Cregg & Stidham
ATTORNEYS

Sept. 10, 1968  E. S. WARNER  3,400,582
BOAT SPEED INDICATOR
Filed May 8, 1967 2 Sheets-Sheet 2

INVENTOR.
ERIC S. WARNER
BY Gregg & Strahan
ATTORNEYS

United States Patent Office 3,400,582
Patented Sept. 10, 1968

3,400,582
BOAT SPEED INDICATOR
Eric S. Warner, 267 Hillcrest Road,
Berkeley, Calif. 94705
Continuation-in-part of application Ser. No. 489,824,
Sept. 24, 1965. This application May 8, 1967, Ser.
No. 636,905
6 Claims. (Cl. 73—181)

ABSTRACT OF THE DISCLOSURE

A device for indicating sensitivity to temperature change relative to flow rate across a body having two sensing probes of heat conductive material. One probe is heated and the probes are arrayed in a housing with a wall thereof and parts of the probes extending through the wall all flush with the surface of the body. Circulation of the flowing fluid around the housing isolates it from effects of temperature-influencing factors from sources other than the fluid, and the probes are of such relative heat capacities that abrupt changes of the fluid temperature are quickly detected because such changes affect the probes at different rates.

---

This is a continuation-in-part of my copending U.S. application Ser. No. 489,824, filed Sept. 24, 1965, now abandoned, and this invention relates to a boat speed indicator and, more particularly, to a device for producing an indication of changes in the speed of a boat reflected by changes in the rate of water flow past a unit area on the hull.

It is important to boating enthusiasts, and particularly those who participate in sail boat racing, to be immediately informed when a maneuver, or some other event or adjustment, causes a change in speed during the course of a race. If an event or maneuver produces a change in speed, the boat racer wants to know of it quickly, so that he can immediately correct, if speed diminished, or continue if speed increased. A delay in completing the proper action may cost the race.

Others have produced speed indicators of various types, but each includes some component that is extended from the hull below the surface of the water. Obviously, a racing sailor is reluctant to add anything to his hull that would result in increased drag or which would increase the possibility of impact or fouling with water plants or other submerged impedimentia. Further, many boats are removed from the water and kept on a trailer or "dolly" after each sailing episode, and may be transported by trailer overland between sailings. A sensing element protruding from the hull would be subject to damage each time the boat is removed from the water to be stored or transported on land.

It is, therefore, an object of this invention to provide a device for indicating speed changes of a boat.

It is a further object of this invention to provide a boat speed indicator that is free of any components which extend beyond the hull surface.

It is a still further object of this invention to provide a fluid flow indicator that operates in response to the rate of heat dispersion occasioned by flow of fluid past a heated body.

Others have measured flow rate by indicating sensitivity to temperature change, but such devices have been generally unsatisfactory as boat speed indicators because of the effects of variations in ambient temperature, of other than the fluid being measured. For example, the warmth of direct sunlight on the non-immersed portion of the assembly housing, or exposure of the assembly housing to rain or bilgewater of a different temperature from the fluid being measured may produce a false and misleading indication.

It is, therefore, another object of this invention to provide a fluid flow indicator that is in thermal isolation from temperature-influencing sources other than that of the fluid being measured.

It is a further object of this invention to provide a fluid flow indicator that will retain calibration over the range of operating temperatures likely to be encountered, but which will react to and indicate abrupt changes in the temperature of the fluid being measured, thereafter returning in a short time to indicate flow rate according to its calibration.

In carrying out this invention, I provide a sensing element of heat conductive material which extends through the hull of the boat with a sensing surface flush with the surface of the hull. The sensing element is heated and has in contact therewith some electrical component, such as a thermistor, in which an electrical characteristic is varied as a result of temperature changes. The sensing element is heated above the temperature of the water so that water flowing past it will tend to cool the sensing element to a level dependent upon the heat supplied, the water temperature and the flow rate past the sensing surface. Thus, assuming constant water temperature, the temperature of the sensing element and electrical component, and hence the value of the electrical characteristic, will remain constant if the speed of the boat remains unchanged. However, any adjustment, maneuver or event which produces an increase or decrease in speed will promptly be reflected in a concomitant change in the rate of heat transferred, and this will be evidenced in a change in the electrical characteristic. This change is registered visibly so that the operator will be aware promptly of the change of speed of the boat through the water. In order to isolate the sensing element from temperature-influencing sources within the hull of the boat, I provide for circulation of the water over which the hull is moving around the sensing element.

For use in tidal waters and areas wherein water temperatures may vary over the racing course, I also provide a compensating sensing element which is unheated, and its temperature, therefore, remains very close to the water temperature. A similar electrical component is in contact with the compensating element and is so connected in relation to the first electrical component that changes in the electrical characteristic of both electrical component that changes in the electrical characteristic of both electrical components resulting solely from water temperature will affect both components to the same degree and will, therefore, be cancelled out.

Other objects and advantages of this invention will become apparent from the description following, when read in conjunction with the accompanying drawings wherein.

Figure 1:
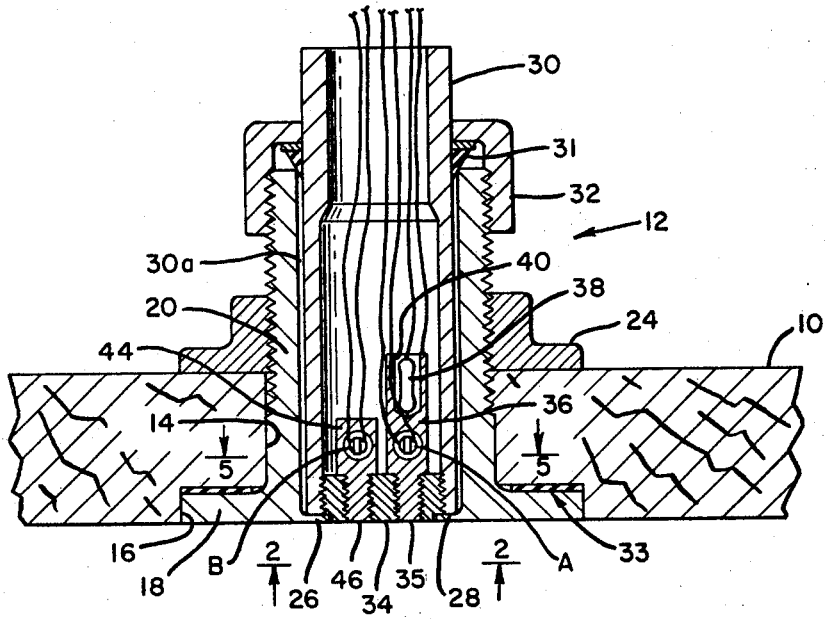
FIG. 1 is a vertical section view of the complete sensing assembly with a partial section of the boat hull in which it is installed.

Referring now specifically to FIG. 1, that boat hull 10 in which my boat speed indicating device 12 is installed is bored at 14 and counterbored at 16 to receive the head 18 of a through-hull marine fitting 20 which is threaded along a major portion of its length 22 to receive a complementary nut 24 which secures the fitting in place. An internal shoulder 26 at the lower end of the marine fitting 20 supports the speed indicating assembly with a complementary shoulder 28 formed at the lower end of the cylindrical housing 30 seated on it. The clearance 30a between the probe assembly housing 30 and the marine fitting is sealed by a packing 31 which is biased against the upper end of the clearance by a packing gland 32. The clearance around the marine fitting may be sealed by any suitable means, such as caulking cotton or suitable bedding compound 33.

Figure 2:
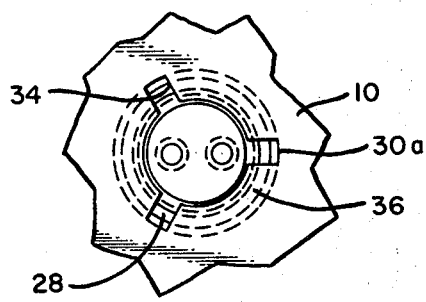
FIG. 2 is a partial view taken along line 2—2 of FIG. 1.
Figure 3:
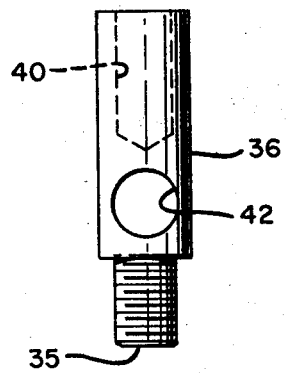
FIGS. 3 and 4 are views in elevation of sensing receptacles forming part of this invention.
Figure 4:
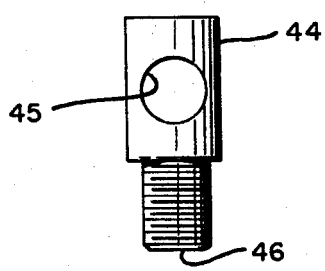

Because the clearance 30a around the probe assembly is sealed just at the upper end, water flowing past the hull 10 is free to circulate through the clearance up to the packing 31 to isolate the probe assembly 30 from temperature-influence sources, such as bilgewater, which may originate within the boat hull. Referring now to FIG. 2, this circulation may be facilitated by the provision of slots or other suitable flow ports 34 in the bottom support shoulder 28. This provides direct flow access to the annular clearance 30a.

This probe assembly housing 30 is preferably formed of a cylindrical body member of material, such as a suitable plastic having high dielectric strength, high corrosion resistance and low thermal conductivity. An end closure 34 is secured, as by threading, in the end of the probe assembly housing 30 and it, in turn, receives a sensing tip 35 extending from the main sensing receptacle or probe 36. The tip 35 is preferably corrosion resistant and may be formed integral with the receptacle of heat conductive material, such as bronze. The outer surface of the end closure 34 and the outer surface of the sensing tip 35, when in place, are in the same plane as the outer surface of the support shoulder 26, the head 18 of the marine fitting 20 and the boat hull 10.

A suitable heater such as an electrical resistor components 38 is carried on the main sensor 36 as by seating it in solder within an accommodating bore 40. Thus, by energizing the resistor, the entire sensing receptacle 36, including the sensing extension 35, is heated above the temperature of the water passing by the hull 10. Carried within a transverse bore 42 through the main sensing receptacle 36 is a suitable electrical component A that has an electrical characteristic that is sensitive to temperature change, such as a thermistor. The thermistor A is preferably secured within the transverse bore 42 as by cementing with an electrically insulating material, so as to be maintained at a temperature closely related to that of the main sensing receptacle 36.

In operation, the water passing by the hull 10 and contacting the outer surface of the sensing probe or extension 34 which is flush with the hull will cool the receptacle 36, and hence the thermistor A to a temperature that is dependent upon the amount of heat supplied to the receptacle 36, the temperature of the water, and the rate at which the water flows by the hull to conduct heat away through the surface of sensing extension 35 that is in contact with the water through which the boat is moving. Of course, even though the amount of electrical energy supplied to resistor 38, and thus the amount of heat supplied to receptacle 36, is normally controlled to a constant amount, other factors such as the density, viscosity and thermal conductivity of the fluid, as well as the character and area of the exposed heat transfer surface 35, will influence the rate of heat transferred, and hence the temperature of receptacle 36, but such factors are normally constant when a particular speed indicating assembly 12 is used in a large body of water.

In operation, the resistance of the thermistor A will vary with any changes in its temperature and, therefore, any suitable device such as a galvanometer for indicating changes in electric current passing through the thermistor will inherently reveal a change in the temperature of the thermistor and, hence, a change in the amount of heat transferred to the water. Assuming that the temperature of the water through which the boat is sailing is constant, and that the amount of heat supplied is constant, any change in the temperature reflects a change in the amount of water flowing past the hull or, stated conversely, a change in the speed of the boat.

In the embodiment described thus far, we have assumed constant water temperature. However, in tidal waters, where changes in water temperature of several degrees Fahrenheit may be encountered, it is desirable to include means for compensating for such changes. Thus, in the preferred ebodiment wherein two sensing thermistors are employed, I include an additional compensating receptacle or probe 44 (FIGS. 1 and 5), and such compensating receptacle has a like extension 46 which, as shown, may be threaded through the sensing assembly end closure 32 with its end surface flush with the outer surface of the panel. The compensating receptacle also includes a thermistor B so mounted in contact with it, as by bonding in a transverse bore 45, that heat is transferred from the thermistors to the receptacle. The compensating receptacle 44 is not heated separately and is, therefore, at a temperature very near the temperature of the water passing by the sensing surface 46. In fact, there is some small temperature rise of receptacle 44 resulting from conduction and convection of heat from receptacle 36, as well as from the electrical energy passing through the thermistor mounted in it, but this temperature rise is minor compared to that of the heated receptacle 36. If desired, the compensating receptacle may be carried in a separate case unaffected by heat from receptacle 36. The operating temperatures of receptacles 36 and 44 will rise or fall a like amount with rise or fall of the temperature of the water to which their tips are exposed, assuming contant rate of flow of water past the surface and after a short time period during which their temperatures adjust to the changed water temperature.

An additional advantage is gained in prompt detection of changes in the temperature of the fluid flowing past the probes by making both probes of high thermal conductivity and by making the compensating probe 36 of different heat capacity than the heated probe, as by making it of different mass in the event that they are of the same material. Thus, when water temperature abruptly changes, one probe will be cooled or heated more rapidly than the other, affecting for a short period of time, say about 30 seconds, the temperature differential indicated at the meter M. For example, a boat sailing toward open ocean may be riding an outgoing tidal current that originates with a relatively warm river stream and can encounter an adjacent counter flowing current of relatively cold flood tide current of ocean water moving in an unfavorable direction. In addition, there are areas such as locations on the downstream side of islands, points of land or other obstacles where the waters are relatively calm and are of slightly different temperatures than the main body of the stream flowing past the obstruction. The detection of streams moving in different directions, and still waters as well, is highly important to the racing sailor, and in the apparatus claimed such differences will be detected because the two probes, being of different mass, will exhibit a different rate of cooling or heating when they are exposed to temperature changes, and with appropriate circuitry such temperature changes are evidenced for a short time on the meter M. Thus, a sailor moving on an ebb tide current favorable to his course, and suddenly detecting a sharp temperature change as the meter needle jumps, would immediately tack or take other action to retain the advantages of the favorable ebb tide conditions.

Figure 5:
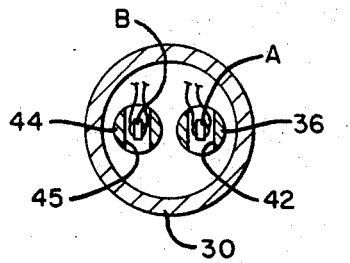
FIG. 5 is a section view taken along line 5—5 of FIG. 1.
Figure 6:
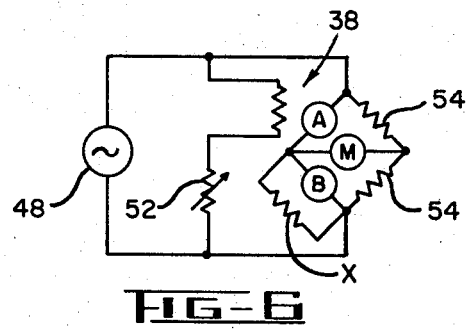
FIG. 6 is a wiring diagram showing the electrical system forming a part of this invention.

Referring now to FIG. 5, I prefer to place a resistor X in parallel with the thermistor B in order to minimize the characteristic effects of the resistance of thermistors to vary with temperature. Since thermistor A is at all times warmer than thermistor B, its resistance will vary with temperature at a different rate than the resistance of thermistor B, assuming both thermistors are compounded of the same material. However, with resistor X installed in parallel, the change in resistance of the arm of the bridge resulting from temperature change is altered so as to be very nearly equal to that of thermistor A. Hence, the instrument will remain in calibration over the wide range of water temperature encountered in pleasure boating. This range could be extended even further by placing an additional resistance in series with the parallel circuit of thermistor B and resistor X.

It will be noted that the compensating thermistor B and its parallel resistor X are placed in an arm of a Wheatstone bridge adjacent to an arm containing the sensing thermistor A, so that any change in resistance resulting from a change in water temperature will affect both arms of the bridge and effectively cancel each other out. That is, a change in water temperature as distinguished from flow rate will ultimately affect thermistors A and B equally. Hence, the electrical potential at the points of connection of meter M to the voltage dividing arms of the bridge will be unaffected by change in water temperature alone after the two receptacles have reestablished their temperature relationship to the water temperature following an abrupt water temperature change. Again, however, by adapting the receptacles so that they respond to temperature changes at different rates, there will be an instantaneous differential meter reading that will establish the existence of a different water temperature.

Now describing the circuit in its entirety, the opposite terminals of the bridge are connected to a source of electrical energy 48. The electrical output of source 48 is regulated to produce a constant voltage to the bridge and the resistor 38.

Connected in parallel across the voltage source is the heater 38 with a variable resistor 52 being provided to control the amount of electrical energy and thus the amount of heat supplied to receptacle 36, fixing the level of temperature above the water temperature of the sensing thermistor A. On the left branch of the circuit I place the sensing thermistor A in one arm and the compensating thermistor B in the other, and on the right branch I place resistors 54. The compensating thermistor B is preferably selected so that its resistance at its operating temperature is approximately equal to the resistance of the heated sensing thermistor A at its higher operating temperature. Across the bridge terminals I place a suitable meter M such as a sensitive voltmeter or ammeter or galvanometer. Thus, any change in water temperature will result in a change in resistance of both thermistors and the change will be effectively cancelled out. On the other hand, any change in boat speed will affect the temperature of thermistor A more than it will affect the temperature of thermistor B, and the change in the relative temperatures of A and B will alter the electrical potential across the terminals of meter M.

Figure 7:
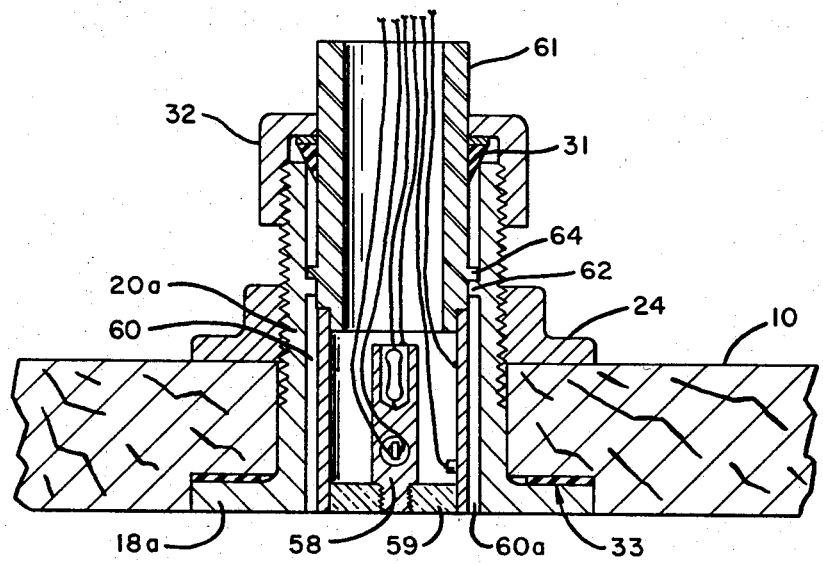
FIGS. 7 and 8 are partial vertical section views of other sensing assembly embodiments.

Referring now to FIG. 7, I have shown another embodiment of my invention wherein the heated probe 58 is mounted in a thermally non-conductive closure 59 at the lower end of a thermally conductive housing 60 having a thermally non-conductive upper extension 61. Complementary internal and external shoulders 62 and 64 on the marine fitting 20a and housing extension 61, respectively, position the housing flush with the hull 10 while permitting water to circulate through the clearance 60a. The extension 61 of thermally insulating material carried on the housing also isolates it from temperature effects of bilge water inside the hull.

The lower portion of the housing may be of the same or different material as that of the heated probe 58a but, in any event, it responds to temperature changes at rates different than does the heated probe 58a, and constitutes the compensating probe corresponding to probe 44 in FIGS. 1 to 5. In other embodiments, the brief indication of fluid temperature change was accomplished by making the probes of different heat capacity, though with equal surface areas exposed to the fluid. This can also be accomplished by making the probes of the same heat capacity but with different areas of heat transfer surface exposed to the flowing fluid. Hence, the surface of the conductive housing 60 exposed to the flowing fluid may be of different area than the exposed surface of the probe 58.

In either arrangement, or in a combination of both, it is desirable that there be a difference in the times required for the probes to come into equilibrium with the new fluid temperature.

Figure 8:
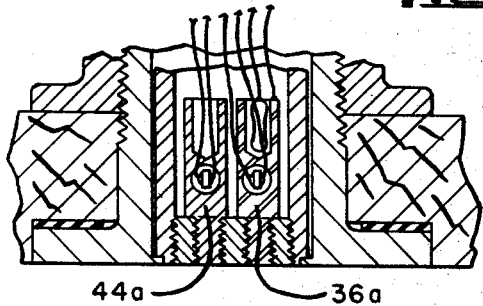

In FIG. 8, the probes 36a and 44a are of the same mass but of different material, e.g., aluminum and brass, so as to be of different heat capacity.

While I have described this invention in connection with preferred embodiments thereof, it is obvious that modifications and changes therein may be made by those skilled in the art without departing from the spirit and scope of the invention as defined by the claims appended hereto.

For example, the signal from the bridge may be amplified through well known circuitry to indicate or record on comparatively rugged instruments.

I claim:

1. A device for indicating fluid flow across the surface of a body comprising:

a housing having at least one wall of thermally nonconductive material, means for mounting said housing to extend through a portion of said body with the outer surface of said one wall adjacent said surface of the body, sensing probe means of thermal conductive material mounted in said housing with a portion thereof extending through said wall and with a sensing surface thereon adjacent said outer surface, means for heating said sensing probe means, compensating probe means having a surface thereon adjacent said outer surface, said sensing and compensating probe means being mounted in thermal separation, means for indicating variations in temperature differential between said sensing and compensating probe means, and seal means around said housing to seal against intrusion of fluid into said body, said seal means being displaced from the outer surface of said body to enable circulation of fluid around said housing so that said circulating fluid separates said housing from other temperature-influencing sources.

2. A device for indicating fluid flow across the surface of a body comprising:

a housing having at least one wall of thermally nonconductive material, means for mounting said housing to extend through a portion of said body with the outer surface of said one wall adjacent said surface of the body, sensing probe means of thermal conductive material mounted in said housing with a portion thereof extending through said wall and with a sensing surface thereon adjacent said outer surface, means for heating said sensing probe means, compensating probe means having a compensating sensing surface thereon adjacent said outer surface, said sensing and compensating probe means being mounted in thermal separation and being of different heat capacities so a sto change in temperature at different rates in response to changes in temperature of fluids flowing across said sensing surfaces to produce a temporary variation in temperature differential between said probe means, and means for indicating variations in temperature differential between said sensing and compensating probe means.

3. The fluid flow indicating device defined by claim 2 wherein one of said probes comprises a wall of said housing.

4. The fluid flow indicating device defined by claim 2 wherein said probes are of the same thermally conductive material but of different mass.

5. The fluid flow indicating device defined by claim 2 wherein said sensing surfaces are of different areas.

6. The fluid flow indicating device defined by claim 5 wherein said probes are of the same heat capacity.

References Cited

UNITED STATES PATENTS

| | | | |
|---|---|---|---|
| 3,326,040 | 6/1967 | Walsh | 73—204 |
| 3,335,606 | 8/1967 | Scarpa | 73—204 |
| 3,336,804 | 8/1967 | Poppendick et al. | 73—204 |
| 3,352,154 | 11/1967 | Djorup | 73—204 |
| 3,015,232 | 1/1962 | Schnoll | 73—204 |
| 3,199,348 | 8/1965 | Salera | 73—204 |

FOREIGN PATENTS 510,183   7/1919   France.

OTHER REFERENCES

Wingo, "Measurement of Low Velocities in Liquids," AEC Research and Development Report, 1958, pp 6–7, 13–14.

DAVID SCHONBERG, *Primary Examiner.*

N. B. SIEGEL, *Assistant Examiner.*